(12) United States Patent
Tanaka

(10) Patent No.: US 11,650,104 B2
(45) Date of Patent: May 16, 2023

(54) BOLOMETER AND METHOD FOR MANUFACTURING SAME

(71) Applicant: NEC Corporation, Tokyo (JP)

(72) Inventor: Tomo Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/386,578

(22) Filed: Jul. 28, 2021

(65) Prior Publication Data

US 2022/0034721 A1 Feb. 3, 2022

(30) Foreign Application Priority Data

Jul. 28, 2020 (JP) .............................. JP2020-127792

(51) Int. Cl.
*G01J 5/20* (2006.01)

(52) U.S. Cl.
CPC ........... *G01J 5/20* (2013.01); *G01J 2005/202* (2013.01)

(58) Field of Classification Search
CPC ........ G01J 5/20; G01J 2005/202; G01J 5/023; G01J 5/04; B82Y 20/00
See application file for complete search history.

(56) References Cited

U.S. PATENT DOCUMENTS

| | | | |
|---|---|---|---|
| 7,723,684 B1 * | 5/2010 | Haddon .................... | G01J 5/20 250/338.1 |
| 8,269,169 B1 * | 9/2012 | Sinton ...................... | G01J 4/04 250/330 |
| 8,436,305 B1 * | 5/2013 | Sood ........................ | G01J 5/20 250/338.1 |
| 2013/0002394 A1 | 1/2013 | Narita | |
| 2014/0105242 A1 * | 4/2014 | Fernandes ............... | G01J 5/023 374/185 |
| 2022/0034720 A1 * | 2/2022 | Tanaka .................. | G01J 5/0853 |

FOREIGN PATENT DOCUMENTS

| | | | |
|---|---|---|---|
| CN | 101774530 B | * | 6/2012 |
| JP | 2007-263769 A | | 10/2007 |
| JP | 2013-231714 A | | 11/2013 |
| WO | 2011/145295 A1 | | 11/2011 |

(Continued)

OTHER PUBLICATIONS

Tarasov et al., Bolometer Based on Carbon Nanotubes, 2006, JETP Letters, vol. 84, pp. 267-270. (Year: 2006).*

(Continued)

*Primary Examiner* — Christine S. Kim
(74) *Attorney, Agent, or Firm* — Sughrue Mion, PLLC

(57) ABSTRACT

An example objective of the present invention is to provide a bolometer capable of reducing its manufacturing cost. A bolometer according to an example aspect of the present invention includes: a substrate; and an infrared detection unit comprising a bolometer film, wherein the infrared detection unit is held on the substrate with a gap therebetween by a supporting unit, wherein the bolometer film is a carbon nanotube film includes semiconducting carbon nanotubes in an amount of 67% by mass or more of the total amount of carbon nanotubes, and the thickness of the carbon nanotube film is in the range of 10 nm to 1 μm, and the density of the carbon nanotube film is 0.3 g/cm³ or more.

12 Claims, 3 Drawing Sheets

(56) References Cited

FOREIGN PATENT DOCUMENTS

WO 2012/049801 A1 4/2012

OTHER PUBLICATIONS

Tarasov et al., Carbon Nanotube Bolometers, 2007, Applied Physics Letters, vol. 90, pages, pp. 1-3. (Year: 2007).*
Omote et al., Density measurement for carbon nanotube film grown on flat substrates, Dec. 3, 2019, Applied Physics Express vol. 13, pp. 1-5. (Year: 2019).*
Basheer et al., Thermal Conversion of Ethanol into Carbon Nanotube Coatings with Adjusted Packing Density, 2019, ACS Omega, vol. 4, pp. 10405-10410. (Year: 2019).*
Suzuki et al., Thermal Device Design for a Carbon Nanotube Terahertz Camera, 2018, ACS Omega, vol. 3, pp. 3540-3547. (Year: 2018).*
Monea et al., Carbon Nanotubes and Carbon Nanotube Structures Used for Temperature Measurement, May 29, 2019, Sensors, vol. 19, pp. 1-25. (Year: 2019).*
Zhang et al., Fully printed flexible carbon nanotube photodetectors, Mar. 20, 2017, Appl. Phys. Lett., vol. 110, pp. 1-5. (Year: 2017).*
Simmons et al., Bolometric Properties of Semiconducting and Metallic Single-Walled Carbon Nanotube Composite Films, Jan. 28, 2015, ACS Photonics, vol. 2, pp. 334-340. (Year: 2015).*
Lu et al., Suspending single-wall carbon nanotube thin film infrared bolometers on microchannels, Apr. 23, 2009, Applied Physics Letters vol. 94, pp. 1-3. (Year: 2009).*
Monea et al., Carbon Nanotubes and Carbon Nanotube Structures Used for Temperature Measurement, 2019, Sensors vol. 19, pp. 1-25. (Year: 2019).*
U.S. Office Action for U.S. Appl. No. 17/386,574 dated Mar. 8, 2023.
NEC Corp—JP2013-231714 A—Google Patents English obtained Feb. 27, 2023.
ACS Material, "Purified Single-Walled Carbon Nanotubes"—Materials Catalogue Sheet, obtained from https://www.acsmaterial.com/purified-single-walled-carbon-nanotubes.html on Mar. 2, 2023—cited for inherency of "purified SWNT" being >90% SWNT.

* cited by examiner

BOLOMETER AND METHOD FOR MANUFACTURING SAME

This application is based upon and claims the benefit of priority from Japanese patent application No. 2020-127792, filed on Jul. 28, 2020, the disclosure of which is incorporated herein in its entirety by reference.

TECHNICAL FIELD

The present invention relates to a bolometer using carbon nanotubes and a method for manufacturing the same.

BACKGROUND ART

Infrared sensors have a very wide range of applications such as not only monitoring cameras for security, but also thermography for human body, in-vehicle cameras, and inspection of structures, foods, and the like, and are thus actively used in industrial applications in recent years. In particular, development of a low-cost and high-performance infrared sensor capable of obtaining biological information in cooperation with IoT (Internet of Thing) is expected.

A bolometer, which is one of the uncooled infrared sensors, has various applications as an inexpensive infrared sensor. An example of the cell structure of bolometer is shown in FIG. 5. This bolometer has an infrared detection unit 210 on a silicon substrate 201, which is separated from the silicon substrate 201 by a gap 202 with a supporting leg 206 as a support. When irradiated with an infrared ray 214, the bolometer film 204 of the infrared detection unit 210 is heated and detects the resistance change caused by temperature change. In such a bolometer, vanadium oxide is used as a bolometer film 204 of the infrared detection unit, and silicon nitride (SiN) 208 is used for the base part of the infrared detection unit 210 and as a coating material for the bolometer film 204. However, since the thicknesses of SiN and vanadium oxide are optimized for detectability as a bolometer, and the infrared light absorption is not sufficient, there is employed a structure in which an infrared reflection plate 209 is provided to reflect the infrared light 215 that is not absorbed by and transmitted through the bolometer film 204 and make the light incident into the bolometer film again (Patent Document 1). In some cases, the infrared light absorption is still not sufficient with such a structure alone, and a light absorbing film 207 is additionally provided directly above the bolometer film, or an infrared absorbing structure 207, which is called "eave", is further provided to efficiently absorb the infrared ray incident into the pixel as shown in FIG. 6.

The silicon MEMS (Micro Electro Mechanical Systems) process is usually used to fabricate such structures. In the MEMS process, firstly, a readout circuit is constituted with a CMOS (Complementary Metal Oxide Semiconductor) transistor and the like in a semiconductor substrate 201, and an interlayer insulating film is formed thereon by the CVD method, and a metal infrared reflection film 209, an interlayer insulating film, and a sacrificial layer are formed on its upper layer. Thereafter, a protection insulating layer of silicon nitride film is formed by the CVD method, and a metal electrode 203 is formed thereon. Next, a bolometer film 204 connected to the metal electrode 203, a second silicon nitride film 208, and an infrared absorption film 207 are formed. Finally, the sacrificial layer is removed by etching to form a gap 202. Thus, as described hereto, manufacturing of bolometers such as those shown in FIGS. 5 and 6 has a problem of requiring a complicated manufacturing method.

In particular, the distance d between the aforementioned infrared reflection film 209 and the bolometer film 204 needs to be set considering the wavelength of the electromagnetic wave to be detected. However, in order to increase the distance between the infrared reflective film 209 and the bolometer film 204, it is necessary to increase the thickness of the aforementioned sacrificial layer, which leads to a problem that the manufacturing becomes more difficult.

In addition, there is a problem that the performance of vanadium oxide, which is mainly used for bolometer films, is limited by its low Temperature Coefficient of Resistance (TCR). In order to improve performance, it is required to use a material with a higher TCR for a bolometer thin film, and a random network of semiconducting carbon nanotubes (CNT), which is a material with a high TCR, is expected to be used as the bolometer film (Patent Documents 2).

However, when carbon nanotubes are used as the bolometer film, there is a problem that the manufacturing process becomes more complicated because the element structure cannot be fabricated only with the ordinary semiconductor process, and this leads to higher costs, especially when pixels need to be integrated into an array sensor for image acquisition. In addition, even when carbon nanotubes were used as the bolometer film, there was still room for improvement in terms of infrared absorption rate.

CITATION LIST

Patent Literature

Patent Document 1: Japanese Patent Laid-Open No. 2007-263769
Patent Document 2: International publication No. WO 2012/049801

SUMMARY OF INVENTION

Technical Problem

The present invention was made in view of the above problem, and an example object thereof is to provide a bolometer capable of reducing its manufacturing cost, and a method for manufacturing the same.

Solution to Problem

One aspect of the present invention is directed to a bolometer comprising
a substrate; and
an infrared detection unit comprising a bolometer, wherein the infrared detection unit is held on the substrate with a gap therebetween by a supporting leg, wherein
the bolometer film is a carbon nanotube film comprising semiconducting carbon nanotubes in an amount of 67% by mass or more of the total amount of carbon nanotubes, and the thickness of the carbon nanotube film is in the range of 10 nm to 1 μm, and the density of the carbon nanotube film is 0.3 g/cm$^3$ or more.

Another aspect of the present invention is directed to a method for manufacturing a bolometer comprising
forming an infrared detection unit on a substrate via a supporting leg;
forming a gap between the substrate and the infrared detection unit; and forming a bolometer film on the infrared detection unit wherein the bolometer film is a carbon nanotube film comprising semiconducting carbon nanotubes in an amount of 67% by mass or more of the total amount of carbon nanotubes, and the thickness of the carbon nanotube film is in the range of 10 nm to 1 μm, and the density of the carbon nanotube film is 0.3 g/cm$^3$ or more.

Advantageous Effect of Invention

According to the present invention, a bolometer capable of reducing its manufacturing cost and a method for manufacturing the same can be provided.

DESCRIPTION OF EMBODIMENTS

[1] Structure of Bolometer

Embodiments of the present invention will be described with reference to the drawings. However, parts that are identical to the conventional example described above may be omitted from the detailed description by using the same name. In the following embodiments, a bolometer that detects infrared light (i.e., an infrared sensor) will be used as an example for explanation, but the bolometer of the present embodiment can also be used to detect, for example, terahertz waves in addition to infrared light, as will be described later. Therefore, as used herein, the terms "infrared ray" and "infrared light" can be read as appropriate for a desired electromagnetic wave to be detected.

Figure 1:
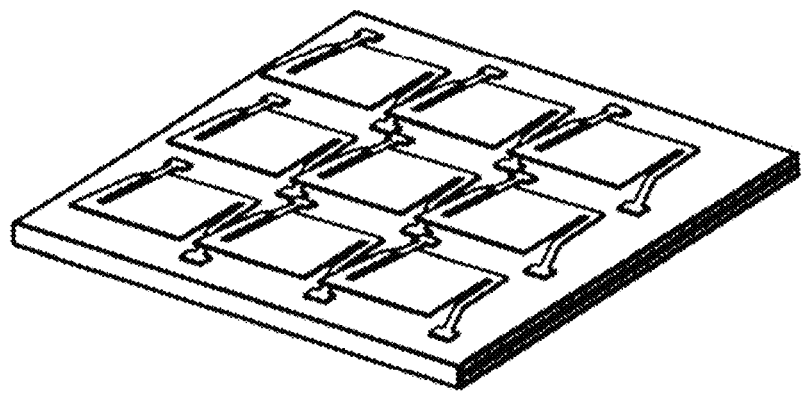
FIG. 1 is a perspective view of a bolometer array.
Figure 2:
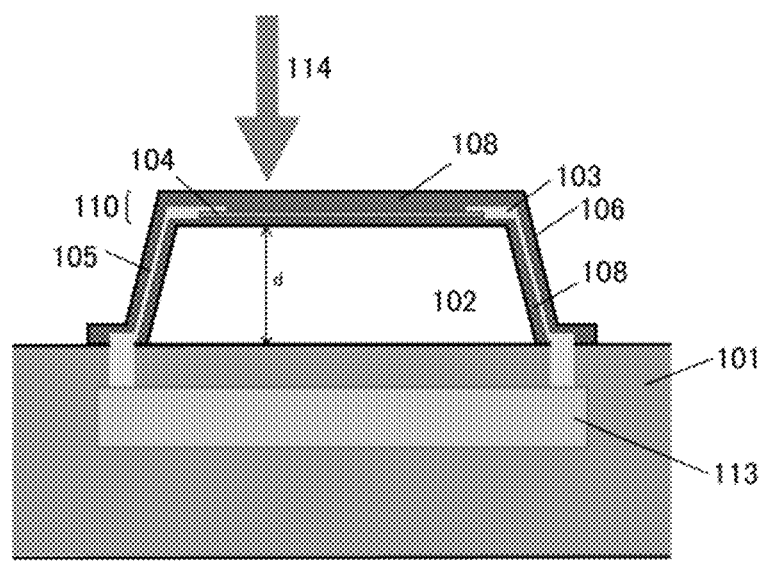
FIG. 2 is a vertical sectional front view showing the cell structure of a bolometer according to an embodiment of the present invention.

The structure of the bolometer according to one embodiment of the present invention is explained with reference to the Figures. FIG. 1 is a perspective view and FIG. 2 is a vertical sectional front view of the cell structure of a single cell. The bolometer of the present embodiment comprises a substrate 101, and an infrared detection unit 110 comprising a bolometer film 104, wherein the infrared detection unit 110 is held on the substrate 101 with a gap 102 therebetween by a supporting leg 106. Herein, the "gap" means that there is an empty space between the infrared detection unit and the substrate. Electrodes 103 provided so as to contact with the carbon nanotube film 104 are connected via contacts 105 to a readout circuit part 113. When an incident light 114 is incident into the bolometer film 104, the bolometer according to the present embodiment detects the intensity of an infrared ray by reading out the resistance change due to the temperature increase of the bolometer film 104 from the electrodes 103.

The bolometer of the present embodiment is characterized in that it uses a predetermined carbon nanotube film having a high infrared absorption rate as the bolometer film 104 as described below.

Figure 5:
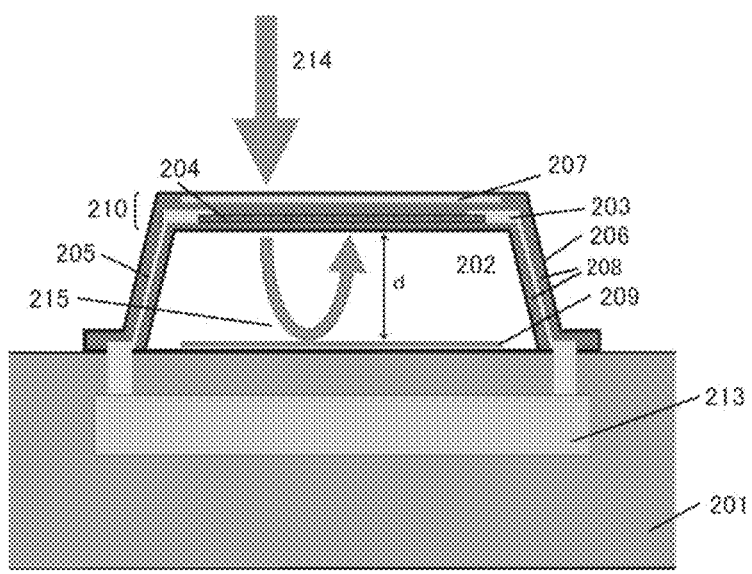
FIG. 5 is a vertical sectional front view showing the cell structure of a conventional bolometer.
Figure 6:
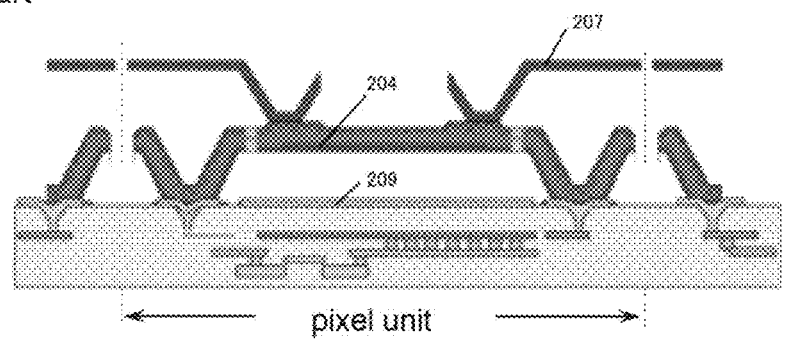
FIG. 6 is a vertical sectional front view showing the cell structure of a conventional bolometer.

In the structure shown in FIG. 5, when an infrared ray is incident from above, most of the incident infrared ray is not absorbed and passes through the bolometer film 204 made of vanadium oxide, and therefore, an infrared reflection plate 209 should be provided between the bolometer film 204 and the substrate 201. However, in the bolometer of the present embodiment as shown in FIG. 2, the absorption rate of infrared light can be increased by using a predetermined carbon nanotube film having a predetermined thickness and density as the bolometer film 104. Therefore, it is not necessarily required to provide an infrared reflection layer (light reflection layer) or an infrared absorbing layer (light absorbing layer), and the element structure can be further simplified and the cost of manufacturing process can thus be lowered.

Furthermore, in the structure shown in FIG. 5, the distance d between the reflection plate 209 and the bolometer film 204, which is namely the height of the gap 202, should be d=λ/4 in consideration of the wavelength λ of the infrared ray to absorb. In contrast, the structure of the present embodiment shown in FIG. 2 does not necessary require a reflection plate, and thus also has an advantage that the height d of the gap 102 can be set to a desired value without considering the wavelength λ of the infrared ray to absorb. Therefore, the bolometer of the present embodiment can be used for detecting an electromagnetic wave of a broader wavelength band as compared to the conventional bolometers. The bolometer of the present embodiment using a carbon nanotube film as a bolometer film can be particularly preferably used for detecting an electromagnetic wave having a wavelength of 0.7 μm to 1 mm. The electromagnetic waves included in this wavelength range include, in addition to infrared ray, terahertz wave.

The bolometer of the present embodiment is preferably an infrared sensor.

[2] Elements Constituting Bolometer

Hereinafter, elements constituting the bolometer according to the present embodiment will be each described in detail.

[2-1] Carbon nanotube film

The carbon nanotube film 104 is a film constituted with a plurality of carbon nanotubes forming conductive paths electrically connecting between electrodes, and preferably having a network structure. The bolometer of the present embodiment uses a predetermined carbon nanotube film as described below in detail to improve the infrared absorption rate, and as a result, simplification of the bolometer structure and cost reduction in manufacturing process can be achieved.

Semiconducting carbon nanotubes having a large band gap and carrier mobility are preferably used for the carbon nanotube film 104. The proportion of the semiconducting carbon nanotubes in the carbon nanotubes constituting the carbon nanotube film is generally 67% by mass or more, preferably 70% by mass or more, more preferably 80% by mass or more, and in particular, preferably 90% by mass or more, more preferably 95% by mass or more, and further preferably 99% by mass or more (including 100% by mass).

As the carbon nanotubes, single-walled, double-walled, and multi-walled carbon nanotubes may be used, and from the view point of separating semiconducting carbon nanotubes, single-walled or few-walled (for example, double-walled or triple-walled), in particular, single-walled carbon nanotubes are preferred. In the carbon nanotubes constituting the carbon nanotube film, the amount of the single-walled carbon nanotubes is preferably 80% by mass or more, and more preferably 90% by mass or more (including 100% by mass).

The diameter of the carbon nanotubes is preferably between 0.6 and 1.5 nm, more preferably 0.6 nm to 1.2 nm, and further preferably 0.7 to 1.1 nm, and optionally preferably 1 nm or less, from the viewpoint of increasing the band gap to improve TCR. When the diameter is 0.6 nm or more, the manufacture of carbon nanotubes becomes much easier. When the diameter is 1.5 nm or less, the band gap is easily maintained in an appropriate range and a high TCR can be obtained.

As used herein, the diameter of the carbon nanotubes means that when the carbon nanotubes film is observed using an atomic force microscope (AFM) and the diameter of the carbon nanotubes is measured at about 50 positions, 60% or more, preferably 70% or more, optionally preferably 80% or more, more preferably 100% thereof is within a range of 0.6 to 1.5 nm. It is preferred that 60% or more, preferably 70% or more, optionally preferably 80% or more, and more preferably 100% thereof be within a range of 0.6 to 1.2 nm, and further preferably within a range of 0.7 to 1.1 nm, and optionally 1 nm or less.

The length of the carbon nanotubes is preferably between 100 nm to 5 μm because dispersion is easy and application properties are excellent. Also, from the viewpoint of conductivity of the carbon nanotubes, the length is preferably 100 nm or more. When the length is 5 μm or less, aggregation upon forming a film is easily suppressed. The length of the carbon nanotubes is more preferably 500 nm to 3 μm, and further preferably 700 nm to 1.5 μm.

As used herein, the length of the carbon nanotubes means that, when at least 50 carbon nanotubes are observed using an atomic force microscope (AFM) and enumerated to measure the distribution of the length of the carbon nanotubes, 60% or more, preferably 70% or more, optionally preferably 80% or more, and more preferably 100% thereof is within a range of 100 nm to 5 μm. It is preferred that 60% or more, preferably 70% or more, optionally preferably 80% or more, and more preferably 100% thereof be within a range of 500 nm to 3 μm, and it is more preferred that 60% or more, preferably 70% or more, optionally preferably 80% or more, and more preferably 100% thereof be within a range of 700 nm to 1.5 μm.

When the diameter and length of the carbon nanotubes are within the above range, the influence of semiconductive properties becomes large and a large current value can also be obtained, and thus, a high TCR value is likely to be obtained when the carbon nanotubes are used in a bolometer.

The thickness of the carbon nanotube film is in the range of, for example, 10 nm to 1 μm, preferably 20 nm to 500 nm, more preferably 50 nm to 200 nm or more.

When the thickness of the carbon nanotube film is 10 nm or more, preferably 50 nm or more, the element structure can be made simpler because an adequate infrared absorption rate is obtained even without comprising an infrared reflection layer or an infrared absorbing layer.

In addition, from the view point of simplifying the manufacturing method, it is preferred that the thickness of the carbon nanotube film is 1 μm or less, preferably 500 nm or less. Also, when the carbon nanotube film is too thick, the contact electrode deposited from above may not fully contact the carbon nanotubes at the bottom side of the carbon nanotube film, and the effective resistance value may become higher in some cases, but when the thickness is within the above range, increase of the resistance value can be suppressed.

Also, in the case of comprising an infrared absorbing layer, it is also possible to make the carbon nanotube film thinner than the above range in order to further simplify the manufacturing process and improve the resistance value.

Also, when the thickness of the carbon nanotube film is in the range of 10 nm to 1 μm as described above, it is also preferable in that printing techniques can be suitably applied to the manufacturing method of the carbon nanotube film.

The thickness of the carbon nanotube film can be determined as an average value of the thickness of the carbon nanotube film measured at arbitrary 10 positions.

The density of the carbon nanotube film is, for example, 0.3 g/cm$^3$ or more, preferably 0.8 g/cm$^3$ or more, more preferably 1.1 g/cm$^3$ or more. The upper limit thereof is not particularly limited, and can be the upper limit of the true density of the carbon nanotube used (for example, about 1.4 g/cm$^3$).

When the density of the carbon nanotube film is 0.5 g/cm$^3$ or more, it is preferred in that the element structure can be simplified because an adequate infrared absorption rate is obtained even without comprising an infrared reflection layer (light reflection layer) or an infrared absorbing layer (light absorbing layer).

Also, when an infrared absorbing layer is comprised, the density of the carbon nanotube film of lower than the above-described density may be appropriately employed.

The density of the carbon nanotube film can be calculated from weight, area, and the thickness obtained as above of the carbon nanotube film.

[2-2] Gap

A gap 102 is provided between the infrared detection unit (light detection unit) 110 comprising the above-described carbon nanotube film 104 and the substrate 101. In a bolometer equipped with an infrared reflecting layer, the height d of the gap should be determined in consideration of the wavelength of infrared rays to be absorbed. In contrast, the bolometer of the present embodiment does not necessary require an infrared reflecting layer, and therefore, has an advantage that the gap height d can be set to a desired value without considering the wavelength of the infrared ray to absorb. From the viewpoint of ease of fabrication, it is preferable to set the gap height d to 0.5 μm or more. The gap height d represents the distance from the top surface of the substrate 101 (or the top surface of the insulating protective film etc., if any, on the substrate) to the bottom surface of the infrared detection unit 110.

The insulation between the infrared detection unit and the substrate can also be improved by vacuum packaging the entire infrared element and keeping the gap 102 in vacuum.

[2-3] Other Components

In the bolometer of the present embodiment, as a component other than the above-described carbon nanotube film 104 and the gap 102, those typically used in a bolometer can be used without limitation, and an example thereof will be described below.

(Substrate)

The substrate 101 may be either a flexible substrate or a rigid substrate, and those in which at least the element forming surface has insulating property or semiconducting property may be used, and in particular, one having an insulating element forming surface is preferred. Examples of the substrate include Si, SiO$_2$·coated Si, SiO$_2$, SiN, parylene, plastic and the like, but is not limited thereto.

(Electrode)

Figure 3:
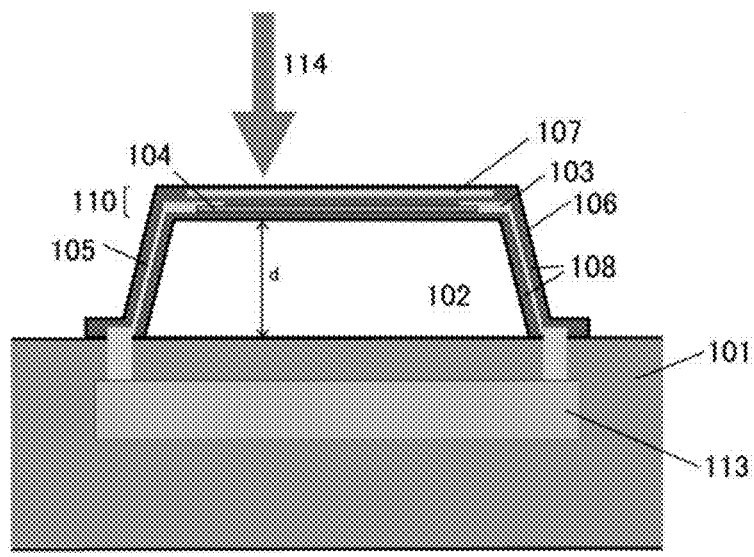
FIG. 3 is a vertical sectional front view showing the cell structure of a bolometer according to an embodiment of the present invention.

The electrode 103 is not limited and for example, gold, platinum, titanium and the like may be used. The thickness of the electrode may be appropriately adjusted and is preferably 10 nm to 1 mm, and more preferably 50 nm to 1 μm. The distance between the electrodes is preferably 1 μm to 500 μm, and for miniaturization, it is more preferably 5 to 200 μm. When the distance is 5 μm or more, a reduction in the nature of TCR can be suppressed, even in the case of containing a small amount of metallic carbon nanotubes. In addition, the distance of 500 μm or less is advantageous when it is applied to an image sensor having a two-dimensional array. The electrode 103 may be provided above the carbon nanotube film 104 as shown in FIGS. 2 and 3, or may be provided beneath the carbon nanotube film 104 (not shown).

(Infrared Absorbing Structure)

The bolometer of the present embodiment uses a predetermined carbon nanotube film having a high light absorption rate, and therefore, an infrared absorbing structure such as an infrared absorbing layer (light absorbing layer) is not necessary required. Therefore, a bolometer according to one embodiment of the present invention does not comprise any infrared absorbing structure as shown in FIG. 2, but if desired, an infrared absorbing structure can be provided.

For example, an infrared absorbing structure in a form of "eave" can be provided in order to efficiently absorb the incident infrared rays and further increase the fill factor. An example of such a structure includes those consisting of SiN, but is not limited thereto, and any structure used in the art can be used without a particular limitation.

Also, as shown in FIG. 3 for example, an infrared absorbing layer 107 may be provided above the carbon nanotube film 104, namely, on the side from which infrared rays are incident. The infrared absorbing layer can be provided directly on the carbon nanotube film 104, or can be provided on a protection layer described later.

The thickness of the infrared absorbing layer depends on its material, and for example, may be from 50 nm to 1 μm.

In a case where an infrared absorbing layer 107 is provided directly on the carbon nanotube film 104, the example thereof includes, but not limited thereto, a coating film of polyimide and the like. An example of the infrared absorbing layer 107 to be provided on a protection layer includes, but not limited thereto, a thin film of silicon nitrate and the like.

(Protection Layer)

As shown in FIG. 2, a protection layer 108 is typically present on the carbon nanotube film 104, and on and beneath the wiring 105. The protection layer can serve as an insulating protection layer, and when the protection layer is provided on the above side of the carbon nanotube film, it also has effects of suppressing doping to carbon nanotubes due to the absorption of oxygen or the like, and of increasing the infrared absorption rate, which is because not only the carbon nanotubes but also the protection layer absorbs infrared ray. Materials that are used as a protection layer in a bolometer can be used for the protection layer 108 without limitation, and examples thereof include a film of silicon nitride, silicon oxide (SiO$_2$), resins such as parylene, acrylic resins such as PMMA and PMMA anisole, epoxy resins, Teflon (R), and the like.

In addition, as described above, the bolometer of the present embodiment does not necessary require a light reflection layer for reflecting the infrared ray transmitted through the bolometer film, and therefore, the bolometer according to one embodiment of the present invention does not comprise any light reflection layer; however, if desired, a light reflection layer may be provided between the carbon nanotube film 104 and the substrate 101, for example on the substrate 101. However, it is preferred that the light reflection layer is not provided from the view point of simplifying the element structure as described above.

Figure 4:
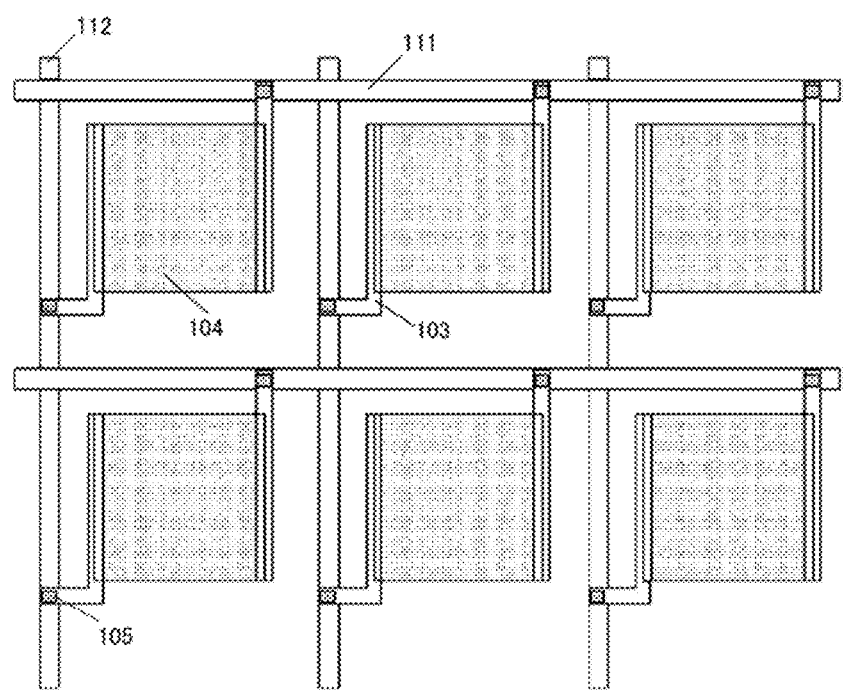
FIG. 4 is a plan view showing the structure of a bolometer array according to an embodiment of the present invention.

Furthermore, although a bolometer of a single cell (single element) is shown in the above embodiment, a bolometer array can be made by arranging a plurality of elements in an array configuration. FIG. 4 is a plan view showing a bolometer array in which the sensor cells of FIG. 2 are arranged in an array configuration. A two-dimensional image sensor can be configured by connecting electrodes 103 of each element to a plurality of column wirings 112 for each column via contacts 105, and connecting to a plurality of row wirings 111 for each row via contacts 105. In such a structure, electrical signals are given to the row wiring 111 and the column wiring 112 corresponding to each cell, and then the resistance change of the cell is read out. An infrared image sensor is obtained by sequentially reading out the resistance changes of all cells.

[3] Method for Manufacturing Bolometer

The method for manufacturing the bolometer according to the present embodiment is not particularly limited and any method used for manufacturing a bolometer can be appropriately employed.

[3-1] Carbon Nanotube Film

The method for forming a carbon nanotube film is not particularly limited, and it is preferred to produce it using a printing method, and in particular, a printing method using a carbon nanotube dispersion liquid is preferable as described later. The printing method includes application (dispenser, inkjet, or the like), transferring (microcontact print, gravure printing, or the like). For example, a method of applying a desired carbon nanotube dispersion liquid on the base part of the aforementioned infrared detection unit 110 to form a film can be exemplified. Alternatively, a carbon nanotube dispersion liquid may be applied on a desired substrate to form a film, and the resulting carbon nanotube film may be layered or transferred on the base part of the infrared detection unit 110.

An example of the method for producing a carbon nanotube dispersion liquid to be used for producing a carbon nanotube film, and the method for forming a carbon nanotube film using the dispersion liquid will be described below. However, it should be noted that the method for producing a carbon nanotube film is not limited to the following.

From the carbon nanotubes to be used in the carbon nanotube dispersion liquid, surface functional groups and impurities such as amorphous carbon, catalysts, and the like may be removed by performing a heat treatment under an inert atmosphere or in a vacuum. The heat treatment temperature may be appropriately selected and is preferably 800 to 2000° C., and more preferably 800 to 1200° C.

The carbon nanotube dispersion liquid preferably comprises a nonionic surfactant.

The nonionic surfactant may be appropriately selected, and it is preferred to use nonionic surfactants constituted by a hydrophilic portion which is not ionized and a hydrophobic portion such as an alkyl chain, for example, nonionic surfactants having a polyethylene glycol structure exemplified by polyoxyethylene alkyl ethers, and alkyl glucoside based nonionic surfactants, singly or in combination. As such a nonionic surfactant, polyoxyethylene alkyl ether represented by Formula (1) is preferably used. In addition, the alkyl moiety may have one or a plurality of unsaturated bonds.

$$C_nH_{2n+1}(OCH_2CH_2)_mOH \quad (1)$$

wherein, n=preferably 12 to 18, and m=10 to 100, and preferably 20 to 100.

In particular, a nonionic surfactant specified by polyoxyethylene (n) alkyl ether (wherein n=20 or more and 100 or less, and the alkyl chain length is C12 or more and C18 or less) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether is more preferred. In addition, N,N-bis[3-(D-gluconamido) propyl]deoxycholamide, n-dodecyl-D-maltoside, octyl-D-glucopyranoside, and digitonin may also be used.

As the nonionic surfactant, polyoxyethylene sorbitan monostearate (molecular formula: $C_{64}H_{126}O_{26}$, trade name: Tween 60, manufactured by Sigma-Aldrich, etc.), polyoxyethylene sorbitan trioleate (molecular formula: $C_{24}H_{44}O_6$, trade name: Tween 85, manufactured by Sigma-Aldrich, etc.), octylphenol ethoxylate (molecular formula: $C_{14}H_{22}O(C_2H_4O)_n$, n=1 to 10, trade name: Triton X-100, manufactured by Sigma-Aldrich, etc.), polyoxyethylene (40) isooctylphenyl ether (molecular formula: $C_8H_{17}C_6H_4O(CH_2CH_2O)_{40}H$, trade name: Triton X-405, manufactured by Sigma-Aldrich, etc.), poloxamer (molecular formula: $C_5H_{10}O_2$, trade name: Pluronic, manufactured by Sigma-Aldrich, etc.), polyvinyl pyrrolidone (molecular formula: $(C_6H_9NO)_n$, n=5 to 100, manufactured by Sigma-Aldrich, etc.) may be used.

The molecular length of the nonionic surfactant is preferably 5 to 100 nm, more preferably 10 to 100 nm, and further preferably 10 to 50 nm. When the molecular length is 5 nm or more, in particular, 10 nm or more, the distance between carbon nanotubes can be appropriately held and aggregation is easily suppressed after the dispersion liquid is applied on the electrodes (to the region including the region between electrode 1 and electrode 2). The molecular length of 100 nm or less is preferred from the viewpoint of constructing a network structure.

Such a nonionic surfactant has a weak interaction with the carbon nanotubes and can be easily removed after applying a dispersion liquid, and therefore, a stable carbon nanotube conductive network can be formed and an excellent TCR value can be obtained. In addition, since such a nonionic surfactant has a long molecular length, the distance between the carbon nanotubes becomes large at the time of applying a dispersion liquid, and the carbon nanotubes are less likely to re-aggregate. Thus, a carbon nanotube network in an isolated and dispersed state can be formed while keeping a moderate interval, and a large resistance change can be achieved against temperature change.

The method for obtaining a dispersion solution is not particularly limited, and conventionally known methods can be applied. For example, a carbon nanotube mixture, a dispersion medium, and a nonionic surfactant are mixed to prepare a solution containing carbon nanotubes, and this solution is subjected to sonication to disperse the carbon nanotubes, thereby preparing a carbon nanotube dispersion liquid (micelle dispersion solution). The dispersion medium is not particularly limited, as long as it is a solvent that allows carbon nanotubes to disperse and suspend during the separation step, and for example, water, heavy water, an organic solvent, an ionic liquid, or a mixture thereof may be used, and water and heavy water are preferred. In addition to or instead of the sonication mentioned above, a technique of dispersing carbon nanotubes by a mechanical shear force may be used. The mechanical shearing may be performed in a gas phase. In a micelle dispersion aqueous solution of the carbon nanotubes and the nonionic surfactant, the carbon nanotubes are preferably in an isolated state. Thus, if necessary, bundles, amorphous carbon, impurity catalysts, and the like may be removed using an ultracentrifugation treatment. During the dispersion treatment, the carbon nanotubes can be cut, and the length thereof can be controlled by changing the grinding conditions of the carbon nanotubes, ultrasonic output, ultrasonic treatment time, and the like. For example, the aggregate size can be controlled by grinding the untreated carbon nanotubes using tweezers, a ball mill, or the like. After these treatments, the length can be controlled to 100 nm to 5 μm using an ultrasonic homogenizer by setting the output to 40 to 600 W, optionally 100 to 550 W, 20 to 100 KHz, the treatment time to 1 to 5 hours, preferably up to 3 hours. When the treatment time is shorter than 1 hour, the carbon nanotubes may be hardly dispersible depending on the conditions, and may remain almost the original length in some cases. From the viewpoint of shortening the dispersion treatment time and reducing the cost, the treatment time is preferably 3 hours or less. The present embodiment may also have the advantage of ease of adjustment of cutting due to use of a nonionic surfactant. In addition, the infrared sensor according to the present embodiment manufactured by using the carbon nanotubes prepared by a method using a nonionic surfactant has the advantage of containing no ionic surfactant which is difficult to be removed.

Dispersion and cutting of the carbon nanotubes generate a surface functional group at the surface or the end of the carbon nanotube. Functional groups such as carboxyl group, carbonyl group, and hydroxyl group are generated. When the treatment is performed in a liquid phase, a carboxyl group and a hydroxyl group are generated, and when the treatment is performed in a gas phase, a carbonyl group is generated.

The concentration of the surfactant in the liquid comprising heavy water or water and a nonionic surfactant mentioned above is preferably from the critical micelle concentration to 10% by mass, and more preferably from the critical micelle concentration to 3% by mass. The concentration less than the critical micelle concentration is not preferred because dispersion is impossible. When the concentration is 10% by mass or less, a sufficient density of carbon nanotubes can be applied after separation, while reducing the amount of surfactant. As used herein, the critical micelle concentration (CMC) refers to the concentration serving as an inflection point of the surface tension measured by, for example, changing the concentration of an aqueous surfactant solution using a surface tensiometer such as a Wilhelmy surface tensiometer at a constant temperature. As used herein, the "critical micelle concentration" is a value under atmospheric pressure at 25° C.

The concentration of the carbon nanotubes in the above cutting and dispersion step (the weight of the carbon nanotubes/(the total weight of the carbon nanotubes, the dispersion medium and the surfactant)×100) is not particularly limited, and for example, may be 0.0003 to 10% by mass, preferably 0.001 to 3% by mass, and more preferably 0.003 to 0.3% by mass.

The dispersion liquid obtained through the above cutting and dispersion step may be used as it is in the separation step described below, or a step of concentration, dilution, or the like may be performed before the separation step. The centrifugation treatment may be performed to remove the bundles, amorphous carbon, metal impurities, and the like in the carbon nanotube dispersion liquid before the separation step. The centrifugal acceleration may be appropriately adjusted, and is preferably 10000×g to 500000×g, more preferably 50000×g to 300000×g, and optionally 100000×g to 300000×g. The centrifugation time is preferably 0.5 hours to 12 hours, and more preferably 1 to 3 hours. The centrifugation temperature may be appropriately adjusted, and is preferably 4° C. to room temperature, and more preferably 10° C. to room temperature.

Separation of the semiconducting carbon nanotubes and the metallic carbon nanotubes can be performed by, for example, the electric-field-induced layer formation method (ELF method: see, for example, K. Ihara et al. J. Phys. Chem. C. 2011, 115, 22827 to 22832 and Japanese Patent No. 5717233, which are incorporated herein by reference). One example of the separation method using the ELF method will be described. Carbon nanotubes, preferably single-walled carbon nanotubes are dispersed by a nonionic surfactant, and the dispersion liquid is put into a vertical separation apparatus, and then a voltage is applied to the electrodes arranged above and below, so that the carbon nanotubes are separated by free flow electrophoresis. The mechanism of separation can be inferred as follows. When the carbon nanotubes are dispersed by the nonionic surfactant, the micelle of the semiconducting carbon nanotubes has a negative zeta potential, whereas the micelle of the metallic carbon nanotubes has an opposite (positive) zeta potential (in recent years, it is considered that the metallic carbon nanotubes have a slightly negative zeta potential or are barely charged). Thus, when an electric field is applied to the carbon nanotube dispersion liquid, the micelle of the semiconducting carbon nanotubes is electrophoresed toward the anode (+) direction, and the micelle of the metallic carbon nanotubes is electrophoresed toward the cathode (−) direction by the effects of the difference between the zeta potentials, and the like. Eventually, the layer in which the semiconducting carbon nanotubes are concentrated is formed near the anode, and the layer in which the metallic carbon nanotubes are concentrated is formed near the cathode in the separation tank. The voltage for separation may be appropriately set in consideration of the composition of the dispersion medium, the charge amount of carbon nanotubes, and the like, and is preferably 1 V or more and 200 V or less, and more preferably 10 V or more and 200 V or less. It is preferably 100 V or more from the viewpoint of shortening the time for the separation step. It is preferably 200 V or less from the viewpoint of suppressing the generation of bubbles during separation and maintaining the separation efficiency. The purity is improved by repeating separation. The same separation procedure may be performed by resetting the dispersion liquid after separation to the initial concentration. As a result, the purity can be further increased.

Through the aforementioned dispersion and cutting step and separation step of the carbon nanotubes, a dispersion liquid in which the semiconducting carbon nanotubes having the desired diameter and length are concentrated can be obtained. As used herein, the carbon nanotube dispersion liquid in which semiconducting carbon nanotubes are concentrated to a desired ratio may be referred to as the "semiconducting carbon nanotube dispersion liquid". The separation tendency of the metallic and semiconducting carbon nanotubes can be analyzed by microscopic Raman spectroscopy and ultraviolet-visible near-infrared absorptiometry.

The zeta potential of the semiconducting carbon nanotube dispersion liquid is preferably +5 mV to −40 mV, more preferably +3 mV to −30 mV, and further preferably +0 mV to −20 mV. The zeta potential of +5 mV or less is preferred because it means that the content of the metallic carbon nanotubes is low. If the zeta potential is lower than −40 mV, separation is difficult in the first place. Here, the zeta potential of the semiconducting carbon nanotube dispersion liquid refers to the zeta potential of the semiconducting carbon nanotube dispersion liquid containing a nonionic surfactant and the micelle of the semiconducting carbon nanotubes obtained through, for example, the separation step by the above ELF method. As used herein, the zeta potential of the carbon nanotube dispersion liquid is a value obtained by measuring the dispersion liquid using an ELSZ apparatus (Otsuka Electronics Co., Ltd.)

The carbon nanotube film can be formed by applying the semiconducting carbon nanotubes dispersion liquid obtained by the aforementioned method on the aforementioned base part of the infrared detection unit, and drying the resultant. Alternatively, the semiconducting carbon nanotubes dispersion liquid may be applied on a desired substrate to form a film, and the resulting carbon nanotube film may be layered on the aforementioned base part of the infrared detection unit.

The concentration of the surfactant in the carbon nanotube dispersion liquid after separation which is used for the application may be appropriately controlled. The concentration of the surfactant in the carbon nanotube dispersion liquid upon application to the substrate is preferably from the critical micelle concentration to about 5% by mass, more preferably, 0.001% by mass to 3% by mass, and particularly preferably 0.01 to 1% by mass to suppress the reaggregation after application and the like.

The method for applying the carbon nanotube dispersion liquid is not particularly limited, and examples thereof include dropping method, spin coating, printing (application such as dispenser, inkjet), or transferring such as microcontact print, gravure printing), spray coating, dip coating, and the like. From the viewpoint of reducing the manufacturing cost, a printing method is preferred.

The formed carbon nanotube film may be subjected to a heat treatment to remove the surfactant and the solvent. The temperature of the heat treatment may be appropriately set as long as it is equal to or higher than the decomposition temperature of the surfactant, and it is preferably 150 to 400° C., and more preferably 200 to 400° C. A temperature of 200° C. or more is preferred because the remaining of the decomposition product of the surfactant can be easily suppressed. A temperature of 400° C. or less is preferred because the change in the quality of the substrate can be suppressed. Also, the decomposition of carbon nanotubes, the change in size, the leaving of functional groups, and the like can be suppressed.

[3-3] Structure and Manufacturing Method of Bolometer and Bolometer Array

For the manufacturing method of the bolometer and bolometer array according to the present embodiment, any manufacturing process typically used for manufacturing a bolometer can be used without limitation, except that a predetermined carbon nanotube film is used. An example of the element structure of a bolometer array and its manufacturing method will be described below.

A readout circuit is constituted with a CMOS transistor and the like in a semiconductor substrate 101, and an interlayer insulating film is formed thereon by the CVD method, and then a sacrificial layer is formed thereon. On its upper layer, a diaphragm film consisting of a silicon nitride film and the like (a film covering a supporting leg 106 and a base part of an infrared detection unit 110) is formed by the CVD method, and a predetermined carbon nanotube film 104 is formed thereon. Thereafter, electrodes 103 and wirings 105 on the supporting leg 106 are formed, and second silicon nitrate film (protection layer 108) is formed thereon.

Finally, the sacrificial layer is removed by etching to obtain a cell with a diaphragm structure. The carbon nanotube film 104 is preferably formed by a printing method as described above, and the thickness and the density thereof are, for example, the thickness of 100 nm and the density of 1.1 g/cm$^3$, respectively.

When an infrared absorbing layer 107 is provided in addition to the above components, it may be formed on the above carbon nanotube film 104 or on a silicon nitrate film using a printing method or the like, or an infrared absorbing layer formed in advance may be layered.

It is also desirable to apply a transistor array to the bolometer array of the present embodiment. The application of a transistor array is advantageous in that, for example, it makes a high-speed scanning possible. The form of the transistor array is not limited, and any form used in the art can be applied without a particular limitation, for example, by building in the transistor array under the photosensitive area.

While the invention has been described with reference to example embodiments and examples thereof, the invention is not limited to these embodiments and examples. Various changes that can be understood by those of ordinary skill in the art may be made to form and details of the present invention without departing from the spirit and scope of the present invention.

Supplementary Note

The whole or part of the example embodiments disclosed above can be described as, but not limited to, the following supplementary notes. (Supplementary note 1) A bolometer Comprising:
  a substrate; and
  an infrared detection unit comprising a bolometer film wherein the infrared detection unit is held on the substrate with a gap therebetween by a supporting leg; wherein
  the bolometer film is a carbon nanotube film comprising semiconducting carbon nanotubes in an amount of 67% by mass or more of
  the total amount of carbon nanotubes, and
  the thickness of the carbon nanotube film is in the range of 10 nm to 1 μm, and the density of the carbon nanotube film is 0.3 g/cm$^3$ or more.
(Supplementary note 2) The bolometer according to the supplementary note 1, comprising no light reflection layer.
(Supplementary note 3) The bolometer according to the supplementary note 1 or 2, wherein 60% or more of the carbon nanotubes contained in the carbon nanotube film have a diameter within the range of 0.6 to 1.5 nm and a length within the range of 100 nm to 5 μm.
(Supplementary note 4) The bolometer according to any one of the supplementary notes 1-3, wherein the carbon nanotube film comprises the semiconducting carbon nanotubes in an amount of 90% by mass or more of the total amount of carbon nanotubes.
(Supplementary note 5) The bolometer according to any one of the supplementary notes 1-4, comprising no light absorbing layer.
(Supplementary note 6) The bolometer according to any one of the supplementary notes 1-5, which is a bolometer array in which a plurality of elements comprising a carbon nanotube film is formed on a substrate.
(Supplementary note 7) A method for manufacturing a bolometer comprising
  forming an infrared detection unit on a substrate via a supporting leg; forming a gap between the substrate and the infrared detection unit; and
  forming a bolometer film on the infrared detection unit wherein
  the bolometer film is a carbon nanotube film comprising semiconducting carbon nanotubes in an amount of 67% by mass or more of the total amount of carbon nanotubes, and
  the thickness of the carbon nanotube film is in the range of 10 nm to 1 μm, and the density of the carbon nanotube film is 0.3 g/cm$^3$ or more.

EXPLANATION OF REFERENCE 101, 201 Substrate
102, 202 Gap
103, 203 Electrode
104, 204 Bolometer film
105, 205 Wiring
106, 206 Supporting leg
107, 207 Infrared absorbing layer (absorbing film)/Infrared absorbing structure
108, 208 Protection layer (insulating protection layer)
209 Infrared reflecting plate
110, 210 Infrared detection unit
111 Row wiring
112 Column wiring
113, 213 Readout circuit
114, 214 Incident light
215 Light transmitted through a bolometer film

The invention claimed is:

1. A bolometer comprising:
  a substrate;
  an infrared detection unit comprising a bolometer film; and
  a first protection layer under a base part of the infrared detection unit, and
  a second protection layer on the bolometer film,
  wherein the infrared detection unit is held on the substrate with a gap therebetween by a supporting leg;
  wherein
    the bolometer film is a carbon nanotube film comprising semiconducting carbon nanotubes in an amount of 67% by mass or more of the total amount of carbon nanotubes, and
    the thickness of the carbon nanotube film is in the range of 20 nm to 500 nm, and the density of the carbon nanotube film is 0.5 g/cm$^3$ or more.

2. The bolometer according to claim 1, comprising no light reflection layer.

3. The bolometer according to claim 1, wherein 60% or more of the carbon nanotubes contained in the carbon nanotube film have a diameter within the range of 0.6 to 1.5 nm and a length within the range of 100 nm to 5 μm.

4. The bolometer according to claim 3, wherein the 60% or more of the carbon nanotubes contained in the carbon nanotube film have a length within the range of 700 nm to 1.5 μm.

5. The bolometer according to claim 1, wherein the carbon nanotube film comprises the semiconducting carbon nanotubes in an amount of 90% by mass or more of the total amount of carbon nanotubes.

6. The bolometer according to claim 1, comprising no light absorbing layer.

7. The bolometer according to claim 1, which is a bolometer array in which a plurality of elements comprising a carbon nanotube film is formed on the substrate.

8. The bolometer according to claim 1, wherein the infrared detection unit is provided so as to face to the substrate with the gap therebetween, and the gap height is 0.5 µm or more, wherein the gap height represents the distance from the top surface of the substrate to the bottom surface of the infrared detection unit.

9. The bolometer according to claim 1, wherein the carbon nanotube film has a network structure constituted with a plurality of carbon nanotubes.

10. The bolometer according to claim 1, wherein the substrate is made of Si, $SiO_2$-coated Si, $SiO_2$, SiN, parylene, or plastic.

11. The bolometer according to claim 1, wherein the thickness of the carbon nanotube film is in the range of 50 nm to 200 nm, and the density of the carbon nanotube film is 0.8 $g/cm^3$ or more.

12. A method for manufacturing a bolometer comprising
forming an infrared detection unit on a substrate via a supporting leg;
forming a gap between the substrate and the infrared detection unit; and
forming a bolometer film on the infrared detection unit using a carbon nanotube dispersion liquid,
wherein
the bolometer film is a carbon nanotube film comprising semiconducting carbon nanotubes in an amount of 67% by mass or more of the total amount of carbon nanotubes, and
the thickness of the carbon nanotube film is in the range of 20 nm to 500 nm, and the density of the carbon nanotube film is 0.5 $g/cm^3$ or more, and wherein
forming a bolometer film on the infrared detection unit using a carbon nanotube dispersion liquid comprises:
mixing a carbon nanotube mixture, a dispersion medium, and a nonionic surfactant to prepare a solution comprising carbon nanotubes;
dispersing and cutting the carbon nanotubes in the solution to prepare the carbon nanotube dispersion liquid;
subjecting the carbon nanotube dispersion liquid to free flow electrophoresis to separate semiconducting carbon nanotubes and metallic carbon nanotubes, thereby preparing a semiconducting carbon nanotube dispersion liquid comprising semiconducting carbon nanotubes; and
applying the semiconducting carbon nanotube dispersion liquid on the substrate.

* * * * *